United States Patent
Demarest

[11] 3,716,891
[45] Feb. 20, 1973

[54] FRANKFURTER SEPARATOR MECHANISM WITH CUTTER SENSOR DEVICE

[75] Inventor: Douglas M. Demarest, Port Washington, N.Y.

[73] Assignee: Linker Machines, Inc., Newark, N.J.

[22] Filed: Feb. 12, 1970

[21] Appl. No.: 10,765

[52] U.S. Cl. .......................................... 17/1 F, 17/49
[51] Int. Cl. ................................................ A22c 11/00
[58] Field of Search ........................................ 17/1 F

[56] References Cited

UNITED STATES PATENTS

| 3,545,035 | 12/1970 | Piereder | 17/1 F |
| 3,156,006 | 11/1964 | Gouba | 17/1 F |
| 2,663,897 | 12/1953 | Greiner et al. | 17/71 |
| 2,799,892 | 7/1957 | Demarest et al. | 17/1 F |
| 2,676,354 | 4/1954 | Mosby | 17/1 F |

Primary Examiner—Jerome Schnall
Assistant Examiner—J. F. Pitrelli
Attorney—Nolte and Nolte

[57] ABSTRACT

A mechanism for a frankfurter, sausage or the like assembly line in which a device automatically senses the ligature between adjacent frankfurters, and the ligature is also stretched for cutting purposes. Thereafter, an assembly maintains the power on the rotating knife so that a clean cut of the ligature is made and the sensor released for indicating the position of the following ligature for severing the same.

6 Claims, 12 Drawing Figures

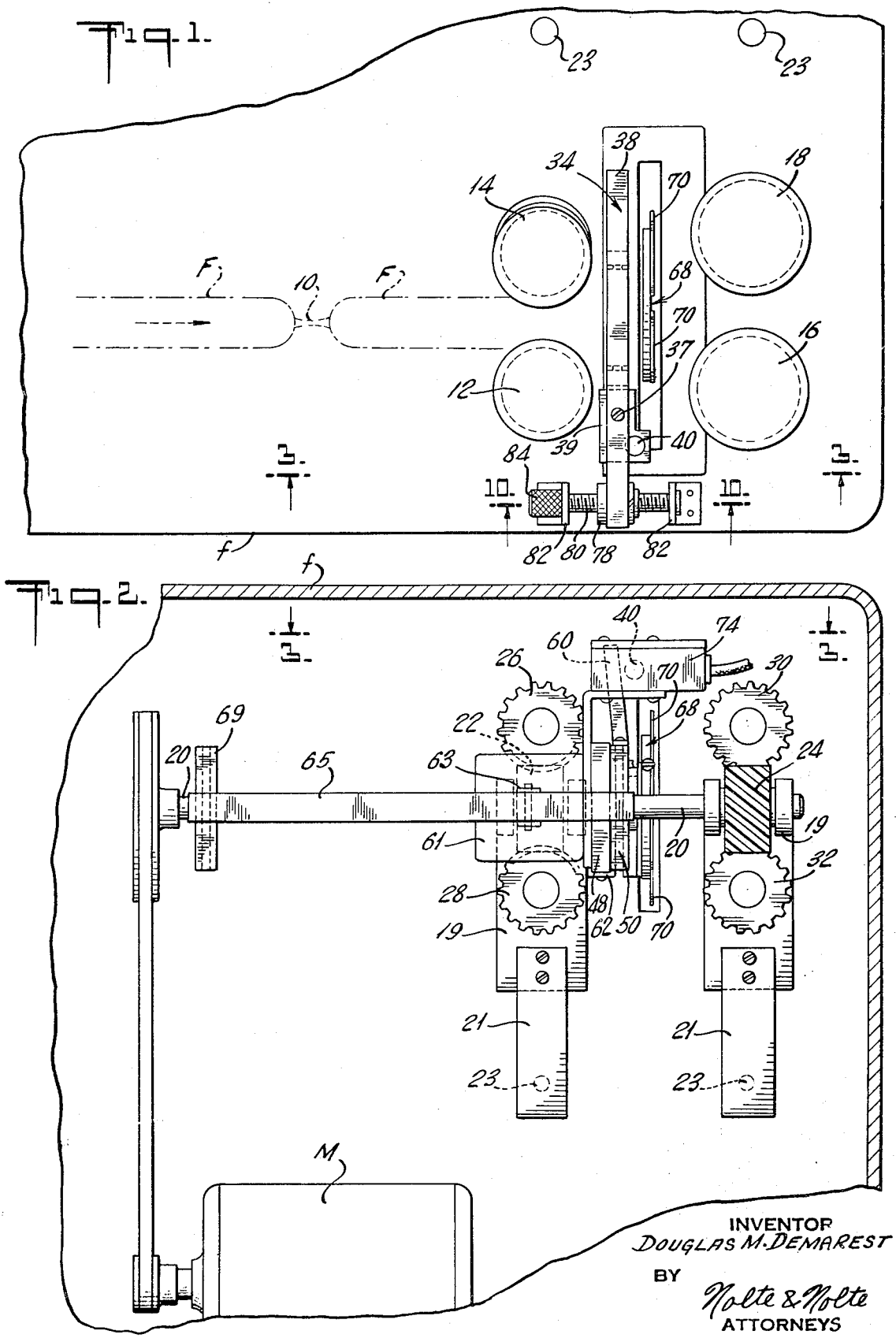

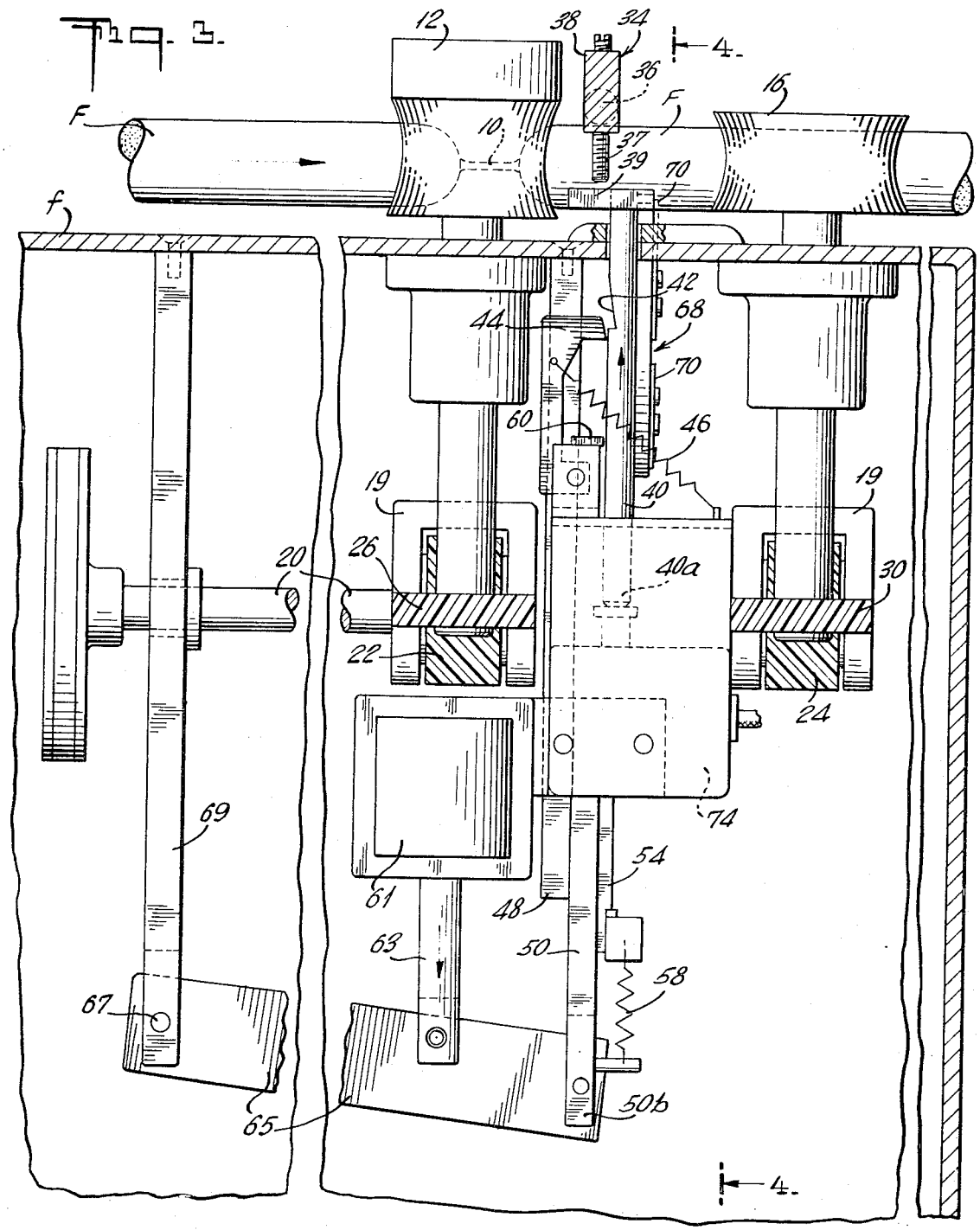

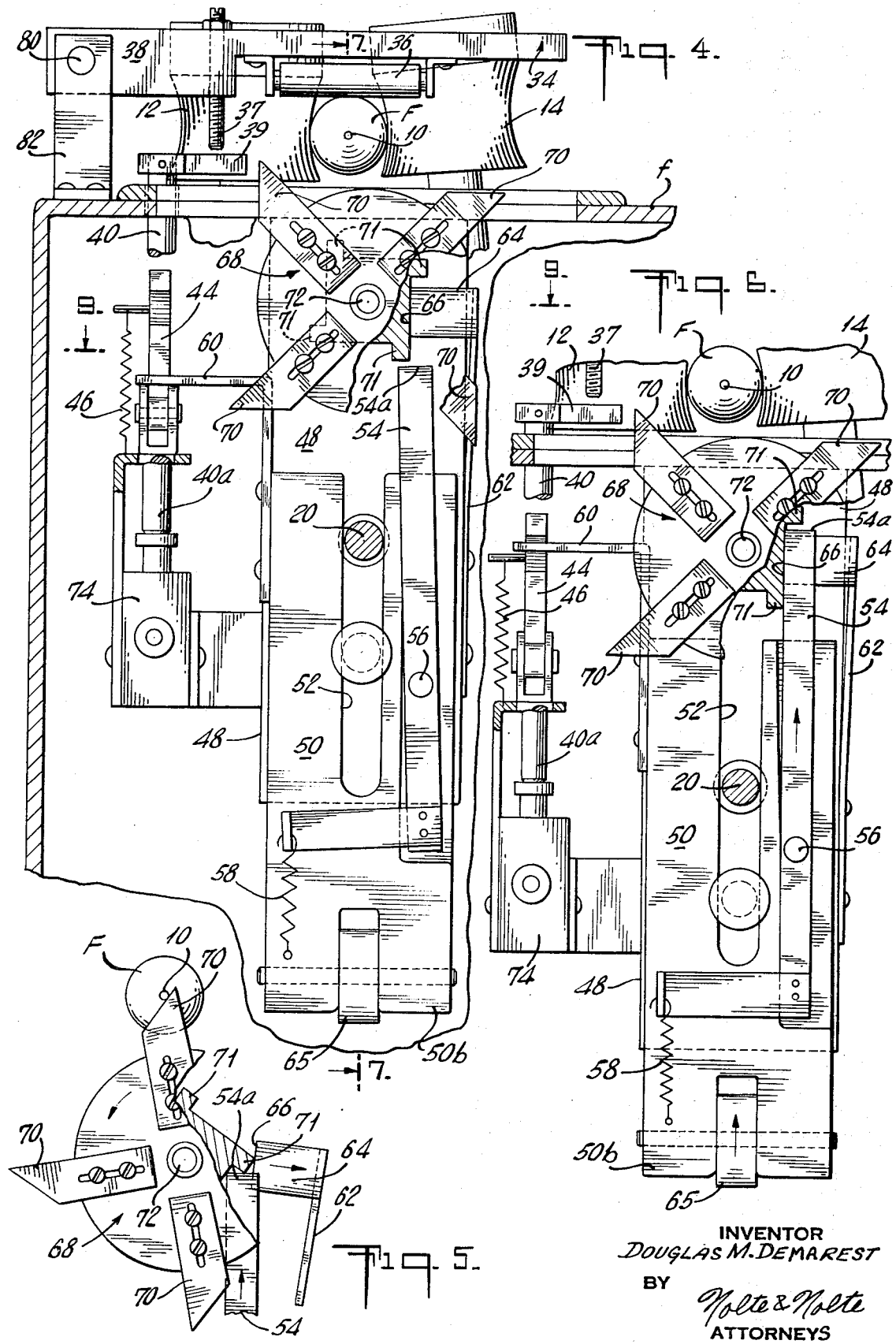

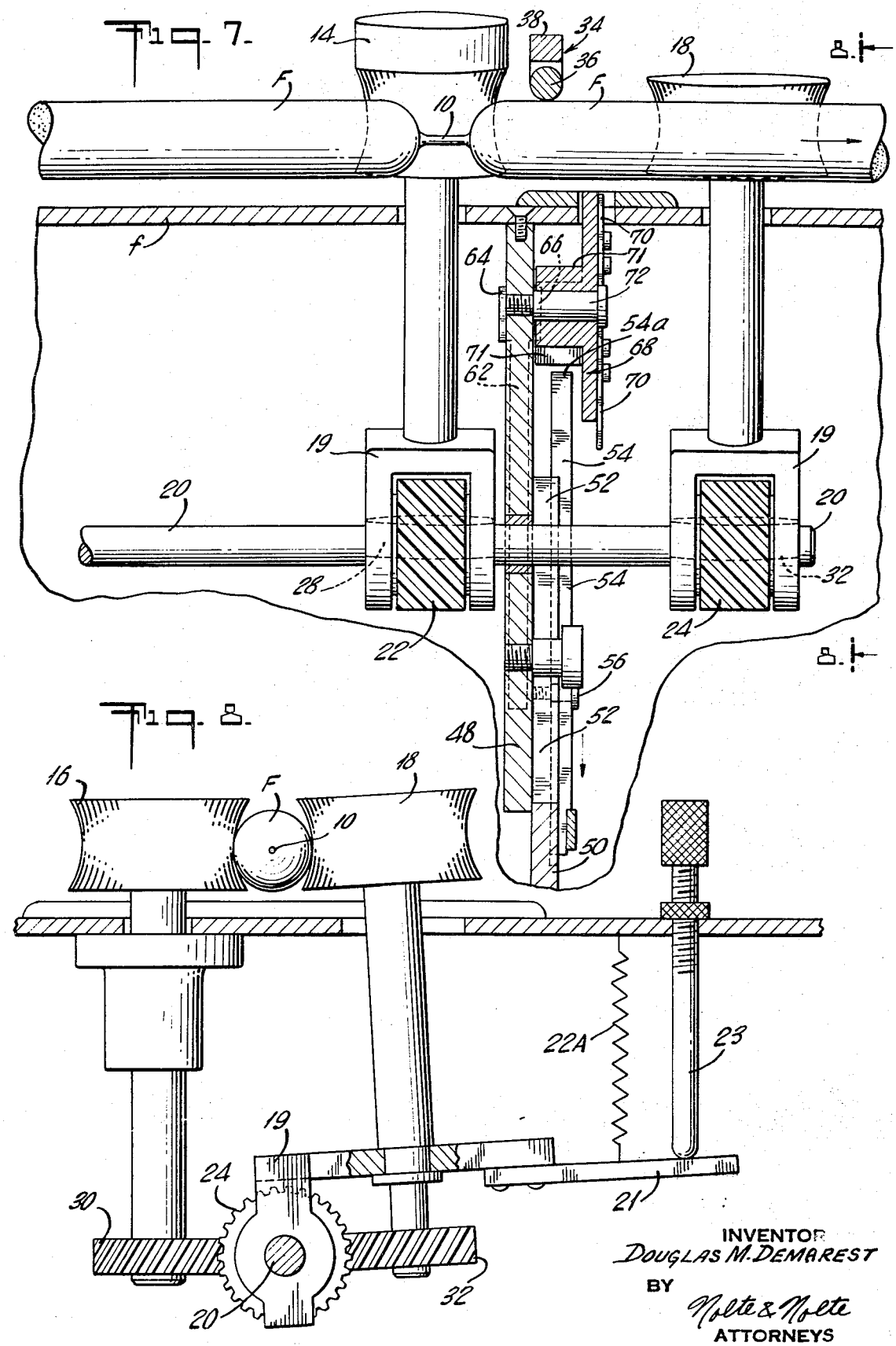

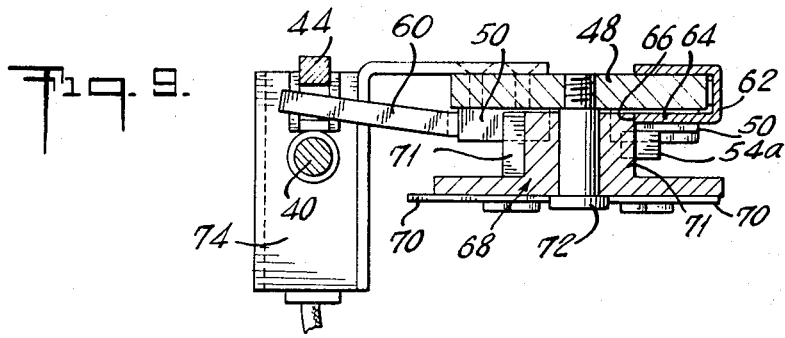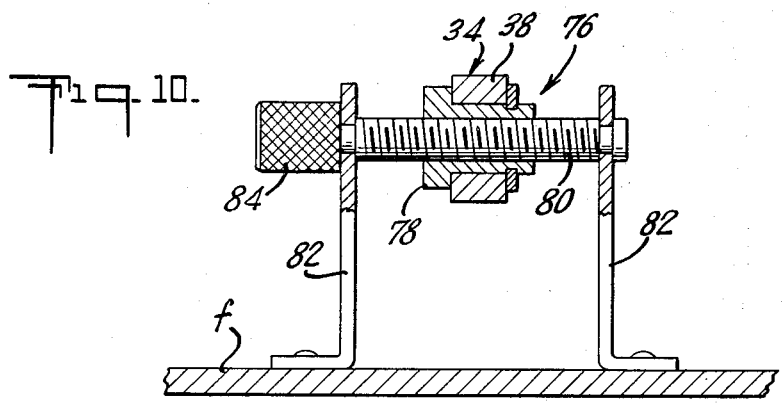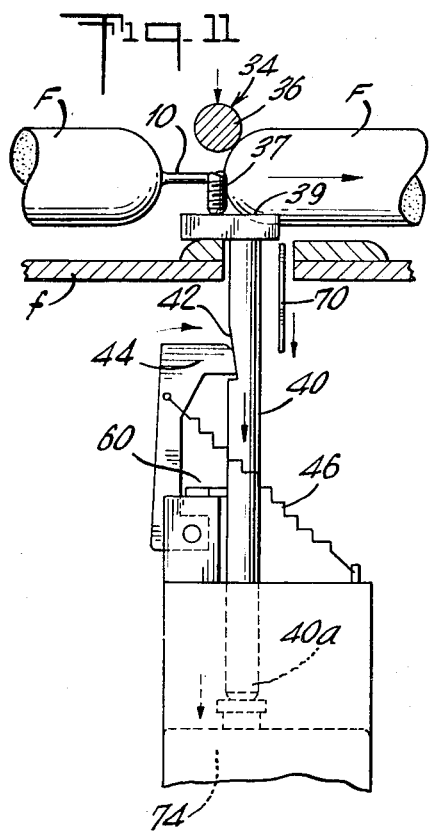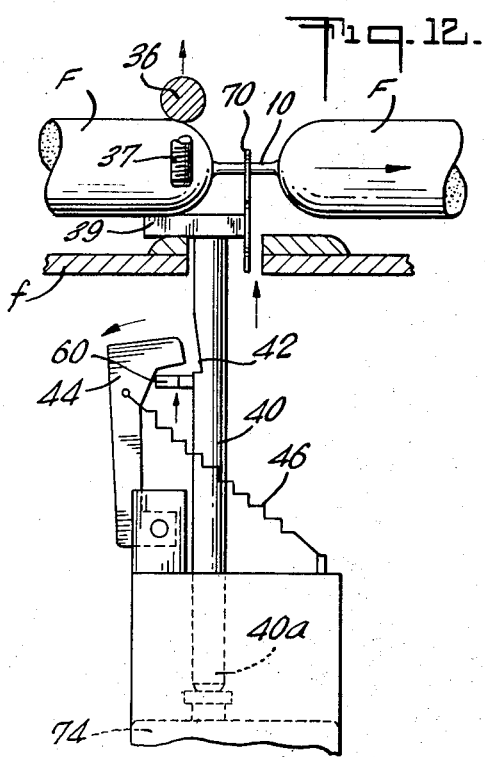

FRANKFURTER SEPARATOR MECHANISM WITH CUTTER SENSOR DEVICE

BACKGROUND OF THE INVENTION

The present invention relates to the processing of a continuous line of frankfurters, sausages or the like connected together by ligatures. Since it is intended to separate the frankfurters, the present mechanism is provided with two sets of rollers of different diameters. These rollers are spaced in a manner to drive a frankfurter therebetween. However, because the larger set of rollers rotates at the same speed as the smaller set of rollers, the frankfurter ligatures are stretched because of greater peripheral speed of the large rollers, thereby permitting a clean cut by a selected blade of a rotary knife located under the processing table and brought into engagement precisely at the location of the stretched ligatures.

The present invention may be applied to frankfurters, sausages, knockwurst and the like of various lengths and diameters. In addition, the present separator mechanism may be applied to any product assembly that is made in a continuous chain and which requires separation into individual products. Moreover, the invention applies to any type of casing, either natural or artificial, and to frankfurters that are formed by twisting the casing or by tying the casing with string to form ligatures. Thus, even though the lengths of the products may vary, an accurate separation is still achieved, inasmuch as each link is sensed separately and an accurate cut made.

In order to insure that the knife cuts the ligatures at the proper locations, a sensing device is incorporated in the present mechanism in order to sense the precise position of the ligatures between the leading and lagging frankfurters. Moreover, the sensing device is so arranged that it acts to maintain the power on the cutting knife through the cutting operation of the ligature. After the cut is made, the power to the knife is stopped and the sensing operation of the sensing device commences again.

The invention will now be further described by detailed reference to specific embodiments which are illustrated in the drawings, wherein:

FIG. 1 is a top plan view of the frankfurter separator mechanism constructed in accordance with the teachings of the present invention;

FIG. 2 is a bottom plan view of the frankfurter separator mechanism illustrated in FIG. 1;

FIG. 3 is a partial elevational and partial sectional view of the mechanism taken along the lines 3—3 of FIGS. 1 and 2, respectively;

FIG. 4 is a sectional view of the mechanism taken along the lines 4—4 of FIG. 3;

FIG. 5 is an elevational view of a detail of construction shown in FIG. 4 showing the cutting blade in cutting position;

FIG. 6 is a further elevational view of the structure shown in FIG. 4 in which the pawl is in its uppermost position;

FIG. 7 is a partial elevational and partial sectional view of the structure taken along the lines 7—7 of FIG. 4;

FIG. 8 is a view taken along the lines 8—8 of FIG. 7;

FIG. 9 is a sectional view taken along the lines 9—9 of FIG. 4;

FIG. 10 is an elevational view taken along the lines 10—10 of FIG. 1; and

FIGS. 11 and 12 are elevational views of the sensing device with the latching arrangement in two positions thereof.

Referring particularly to the drawings, and especially to FIGS. 1 and 2 thereof, a line or succession of frankfurters F are interconnected by ligatures 10 formed by the frankfurter casing. The objective of the present mechanism is to properly sever each frankfurter F from the line. To achieve this objective, the frankfurters pass through a first pair of spaced rollers 12 and 14 and a second pair of spaced rollers 16 and 18, each of the latter having a larger diameter than the diameter of each of the rollers 12 and 14. As seen in FIG. 2, a Motor M drives a shaft 20. Mounted on shaft 20 are identical worms 22 and 24 which drive identical worm gears 26, 28, 30 and 32. Thus, since all the worm gears are rotating at the same speed the peripheral speed of the larger diameter rollers 16 and 18 is greater than the peripheral speed of the smaller diameter rollers 12 and 14, thereby causing the ligatures 10 to be stretched when the rollers 16 and 18 engage a leading frankfurter F and the rollers 12 and 14 engage the following frankfurter F with the stretched ligature 10 therebetween.

In order to properly cut each of the ligatures 10 a sensing device referred to generally by the numeral 34 is employed. As seen in FIG. 4, the sensing device includes a sensing roller 36 supported on a horizontally disposed and pivotable arm 38, the latter being provided with an adjustable screw-threaded member 37 which projects substantially at right angles to the plane of arm 38. As further seen in FIGS. 11 and 12, the rod or element 40 is provided with a notch 42 in which a pivotable latch 44 is adapted to engage therein by means of the biasing force of spring 46. It should be noted that when pivotable arm 38 pivots downwardly member 37 depresses a platform 39 that is affixed to the top of rod 40. However, when the roller 36 rides on top of any of the frankfurters the member 37 assumes the normal position shown in FIG. 4, in which there is a clearance between the member 37 and the platform 39.

A fixed mounting plate 48, as seen in FIG. 4, mounts a movable plate 50 having an elongated slot 52 through which the drive shaft 20 projects. A pawl 54 is pivoted at 56 to the plate 50 and is provided with a biasing spring 58. Also secured to movable plate 50 is an L-shaped knock-off bar 60. The function of knock-off bar 60 will be explained in detail hereinafter.

A leaf spring 62 is secured at one end thereof to the side edge of the fixed mounting plate 48. The upper end of the leaf spring 62 is provided with an element 64 having a flat edge surface 66 for a purpose explained hereinafter.

The knife element 68 is provided with four spaced knife edges 70, all mounted for rotation about a shaft 72 on plate 48.

The pawl 54 is so constructed and mounted that upon elevation thereof the end 54a abuts an abutment 71 of the knife element 68, as seen in FIG. 5. When the pawl 54 has completed its upward movement the same is in the position shown in FIG. 6 in which the knife element 68 has rotated 90° and one of the knife edges 70 is moved through the cutting sequence in which the stretched ligature is severed. The cutting operation is performed as illustrated in FIG. 5.

In order to determine when to initiate the cutting sequence of each of the ligatures 10 the sensing roller 36 of the sensing device 34 rides on the top surfaces of frankfurters F, as seen in FIGS. 3, 4, 11 and 12. It should be noted from FIG. 11 that when the sensing roller commences to drop downwardly at the trailing end of the frankfurter F the upstanding rod 40 is moved downwardly by member 37 pushing downwardly on platform 39 and the end thereof 40a engages a microswitch 74 to thereby depress the same and consequently to make the circuit through a solenoid 61 which raises plate 50 to power to the knife element 68. Accordingly, as seen in FIG. 3, the solenoid arm 63 is secured to a link 65, one end of which is pivoted at 67 to a plat 69 secured to the frame f while the other end of link 65 is pivotally secured to the lower end 50b of movable plate 50. Thus, when rod is depressed by sensing device 34 the mircoswitch 74 closes thereby making the circuit to energize solenoid 61 which in turn activates the solenoid arm 63 to raise link 65 thereby elevating plate 50.

As seen in FIG. 11, when rod 40 is depressed it is latched by means of latch 44 in order to maintain the switch 74 in a depressed condition and to retain the closed circuit to the solenoid 61. Thus, even though the sensing roller 36 has moved upwardly to the position shown in FIG. 12 the power remains applied to the knife element 68. When this occurs, the latch 44 is inserted in the notch 42 under the action of biasing spring 46. This arrangement prevents the rod 40 from moving upwardly during the cutting sequence of a knife edge 70, and opening the microswitch 74, as stated hereinbefore, the pawl 54, together with the element 64 causes the knife element 68 to rotate on shaft 72.

The sequence of operation of the present mechanism is as follows: As shown in FIG. 3, when the sensing roller 36 rests on the leading frankfurter F member 37 is raised and clear of platform 39 of rod 40, whereby the circuit to the solenoid 61 is open and plate 50 is in the down position. When the sensing roller drops down between frankfurters as seen in FIG. 11, member 37 depresses rod 40 closing switch 74 to energize solenoid 61, and this raises plate 50 and operates the knife element 68. During the travel of frankfurter from sensing position (shown in FIG. 11) to cut position (shown in FIG. 12) rod 40 is latched to retain the circuit through the solenoid so as to completely raise plate 50 and cut ligature to complete the cycle even through member 37 has been raised from rod 40 by the sensing roller 36 riding up on leading edge of the trailing frankfurter before the cut is made (FIG. 12).

When plate 50 is raised and the cut is made, knock off bar 60, carried by plate 50 biases latch 44 away from rod 40 (see FIG. 12). A spring (not shown) in switch 74 thereafter elevates rod 40 back to position shown in FIG. 3.

The elevation of the rod 40 also breaks the circuit to the solenoid permitting link 65 and plate 50 to drop down to the position shown in FIG. 3.

As seen in FIGS. 1 and 10, a lateral adjustment device 76 is shown in which the horizontally-disposed sensing arm 38 is provided with a nut 78, shown in FIG. 10, traveling on threaded bolt 80 rotatable in spaced supports 82. A knurled finger piece 84 fixed to the end of the bolt 80 is provided for manually adjusting the sensing arm 34 on the threaded bolt 80 while the nut 78 is restrained from rotation with bolt 80. As seen in FIGS. 1, 3, 10, 11 and 12, the member 38 can be adjusted laterally a considerable distance due to the width of the platform 39. Therefore, a considerable range of adjustment of the sensing device 34 is achieved by the present mechanism.

As seen in FIG. 8, rollers 14 and 18 are laterally adjustable for different size frankfurters. Both of the rollers are carried by brackets 19 which are pivotally mounted on shaft 20. Brackets 19 have extensions 21 to which a spring 22A, connected from the frame F is attached. An adjustable screw 23 is threaded through the top wall of frame F and becomes a stop for extension 21. Rotation of screw 23 brings rollers 14 and 18 toward or away from rollers 12 and 16, and thereby adjust the distance between the pairs of rollers. In addition, the worm gears secured to rollers 14 and 18 rotate in a planetary fashion about their respective worms.

It should be noted, as seen in FIG. 3, that the screw-threaded member 37 can be adjusted so that the distance between the end thereof and the adjacent platform 39 can be varied in order to correspond to the various diameters of the product being processed, such as frankfurters, sausages or knockwurst. It should also be apparent that some of the individual knife edges 70 may be removed in order to selectively cut the ligatures between alternate or other numbers of frankfurters or the like.

What is claimed is:

1. A separator mechanism for frankfurters, sausages or the like, wherein a line of frankfurters are connected by casing ligatures comprising: a drive means for moving said frankfurter line through a frankfurter separating area, a sensing device sensing the location of each of the ligatures, said drive means for the frankfurters causing the ligatures between successive frankfurters to be stretched in said frankfurter separating area, a knife operatively connected to said sensing device for severing each of said stretched ligatures, a fixed mounting plate having said knife with a plurality of spaced blades mounted thereon for rotation into and out of cutting position, a pawl operatively connected to said mounting plate, a latch movably mounted on said fixed mounting plate, a power source, a switch connected to said power source, said sensing device having a pivotable arm provided with an adjustable member, an element having one end adjacent to said switch and the other end adjacent to said adjustable member, the latter being adapted to engage said element and thereby selectively close and open said switch whereby power can be applied to or cut-off from said knife, said element having a notch in which said latch can be inserted in order to maintain said element in a position whereby said switch is closed and power is supplied to said knife.

2. A separator mechanism as claimed in claim 1, wherein said latch latches into said notch and maintains said switch in a closed position when said sensing device detects said ligature during the cutting sequence thereof.

3. A separator mechanism as claimed in claim 2, further comprising a knock-off bar operatively connected to said movable mounting plate, whereby upon elevation of said movable mounting plate said knock-off bar unlatches said latch thereby causing said element to be elevated out of contact with said switch and power is cut-off to said knife.

4. A separator mechanism as claimed in claim 1, wherein said adjustable member is positioned substantially perpendicular to the plane of said arm and is screw-threaded therein in order to provide adjustment for said element towards and away from said element.

5. A separator mechanism as claimed in claim 1, wherein four equally-spaced blades rotate sequentially through a cutting position of each of said ligatures.

6. A separator mechanism as claimed in claim 1, wherein said sensing device is provided with a sensing arm and wherein said adjusting means is a rotatable bolt, a nut screw-connected on said bolt and being operatively connected to said sensing arm whereby when said bolt is rotated said nut and said sensing arm are shifted laterally.

* * * * *